Figure 1:
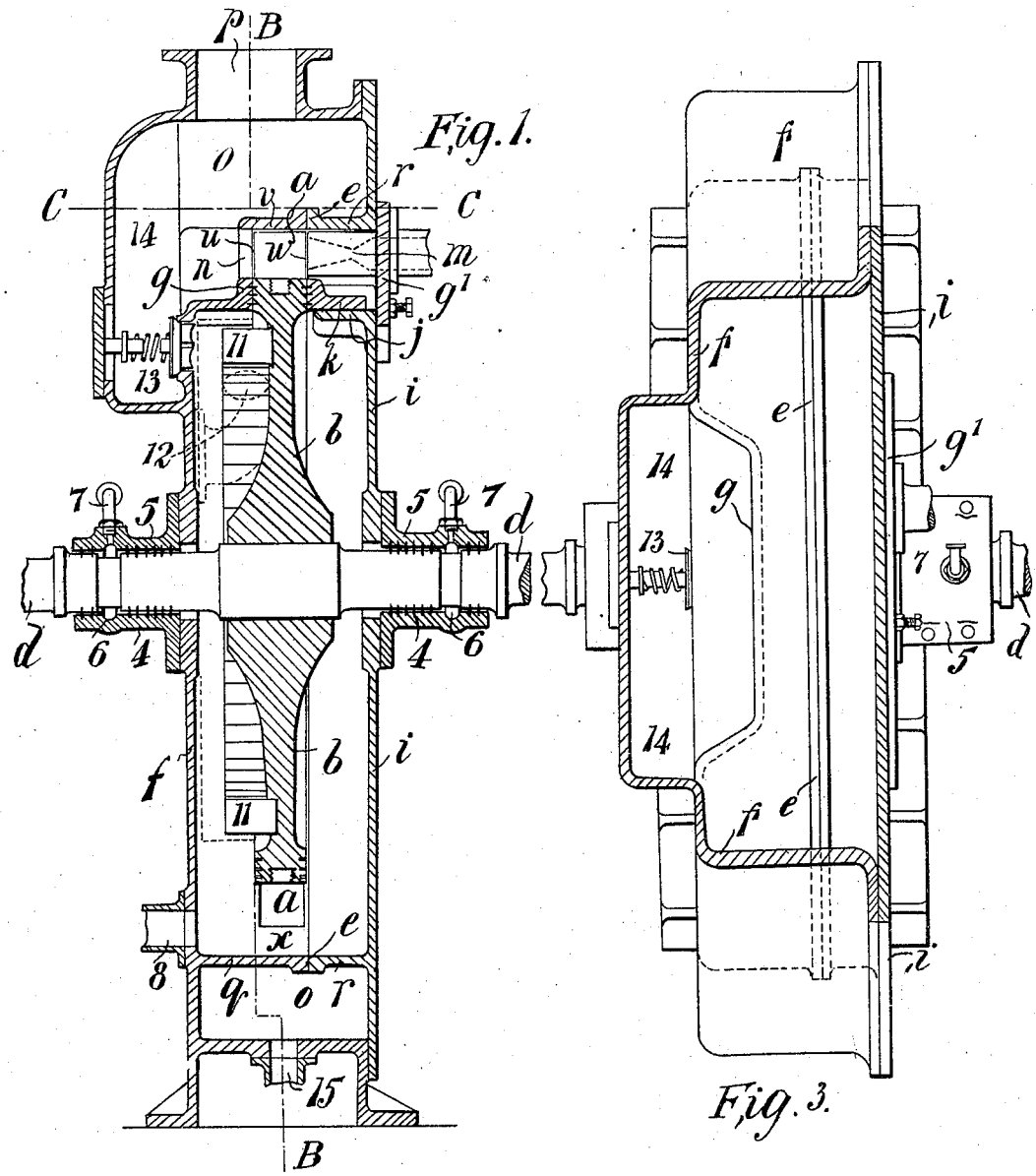

No. 775,634. PATENTED NOV. 22, 1904.
C. A. PARSONS.
TURBINE.
APPLICATION FILED FEB. 27, 1904.
NO MODEL. 6 SHEETS—SHEET 2.

Attest
L. B. Middleton
Edward Santon

Inventor
Charles A. Parsons
by Ellis Spear & Co
Attys

No. 775,634. PATENTED NOV. 22, 1904.
C. A. PARSONS.
TURBINE.
APPLICATION FILED FEB. 27, 1904.
NO MODEL. 6 SHEETS—SHEET 3.
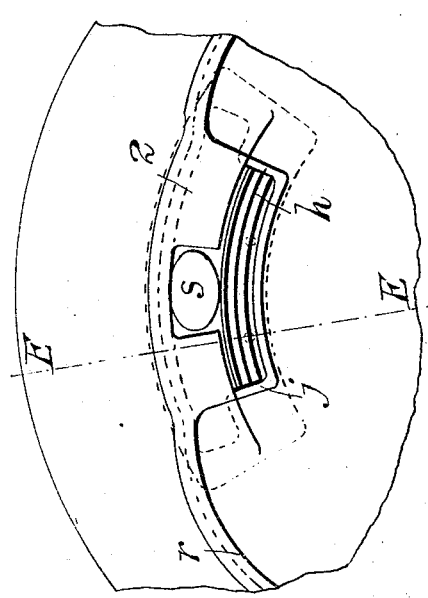
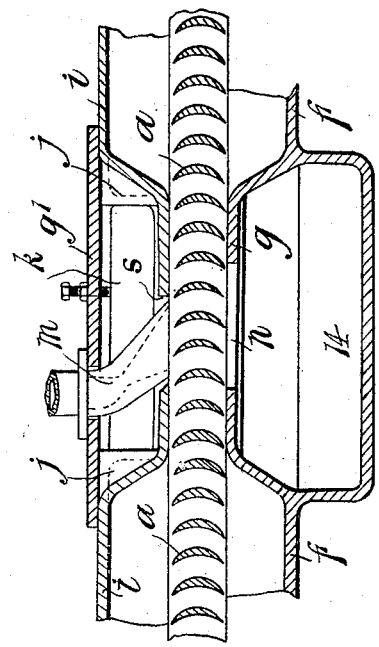
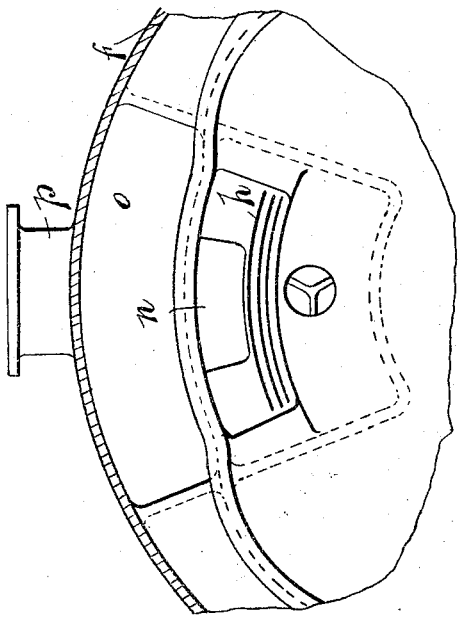
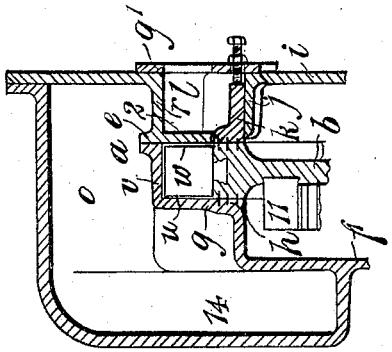
Attest
L. B. Middleton
Edward Santon
Inventor
Charles A. Parsons
by Ellis Spear & Co.
Attys

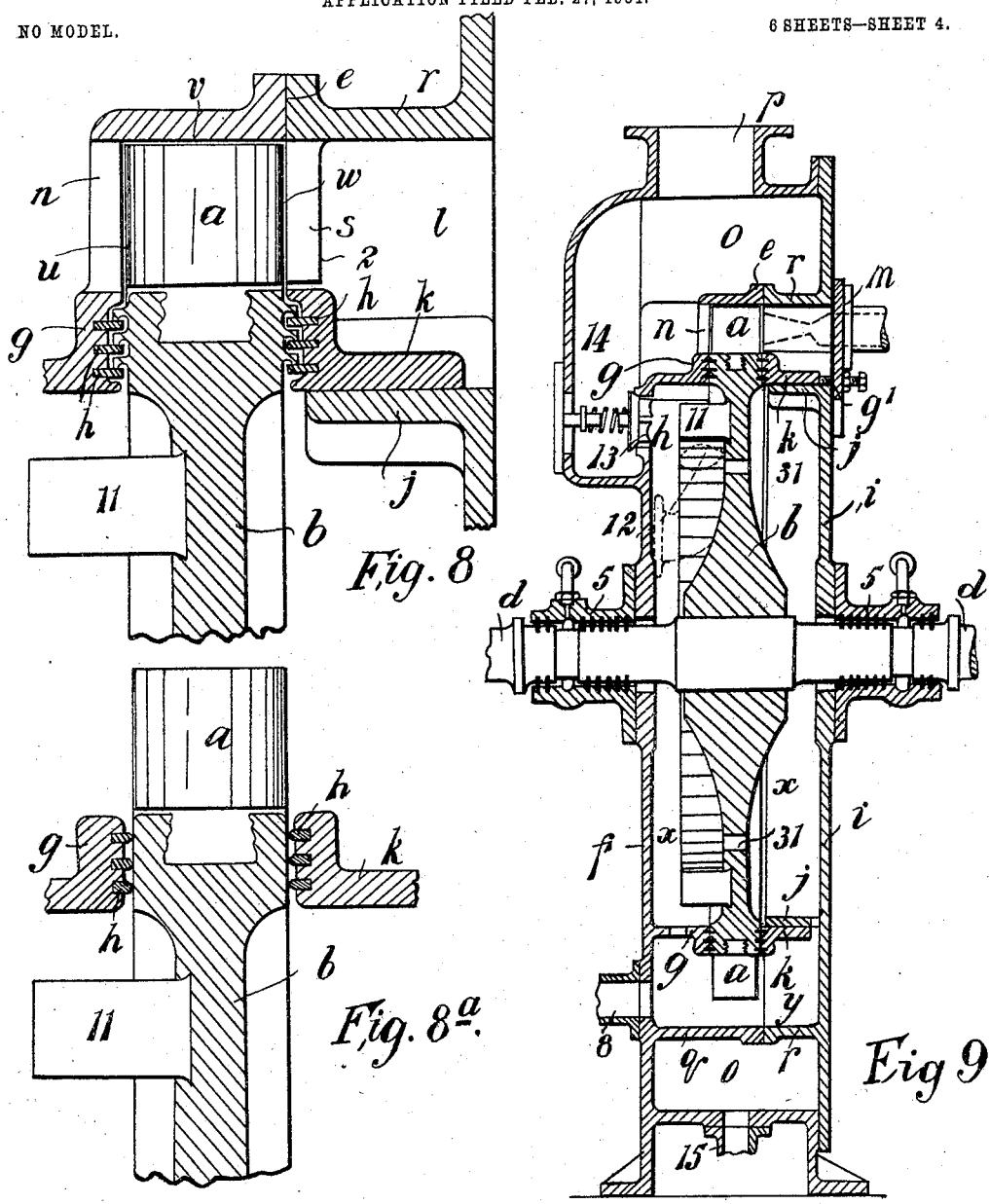

No. 775,634. PATENTED NOV. 22, 1904.
C. A. PARSONS.
TURBINE.
APPLICATION FILED FEB. 27, 1904.
NO MODEL. 6 SHEETS—SHEET 5.
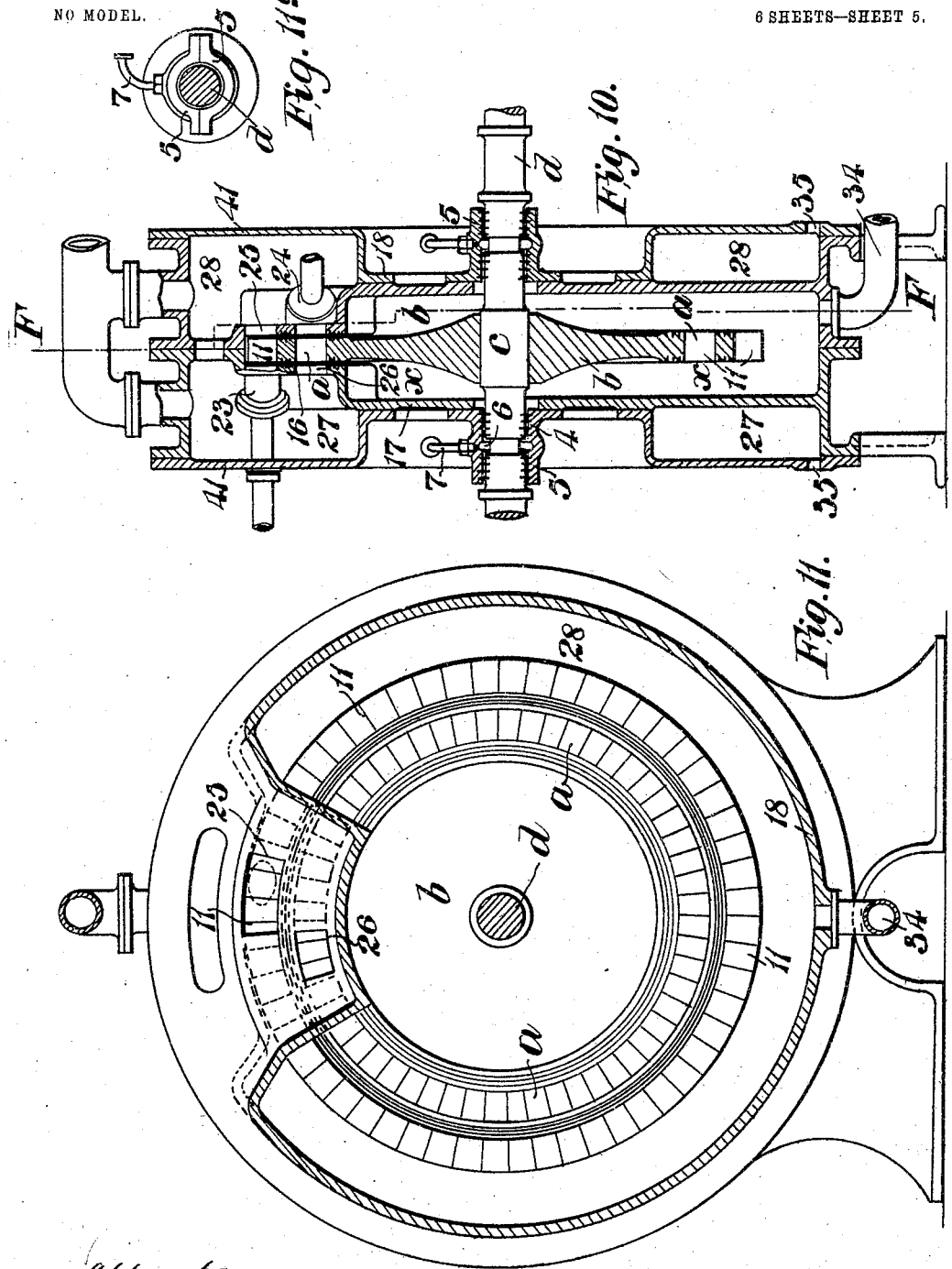
Attest
L. B. Middleton
Edward Sarton
Inventor
Charles A. Parsons
by Ellis Spear & Co
Attys.

No. 775,634. PATENTED NOV. 22, 1904.
C. A. PARSONS.
TURBINE.
APPLICATION FILED FEB. 27, 1904.
NO MODEL. 6 SHEETS—SHEET 6.
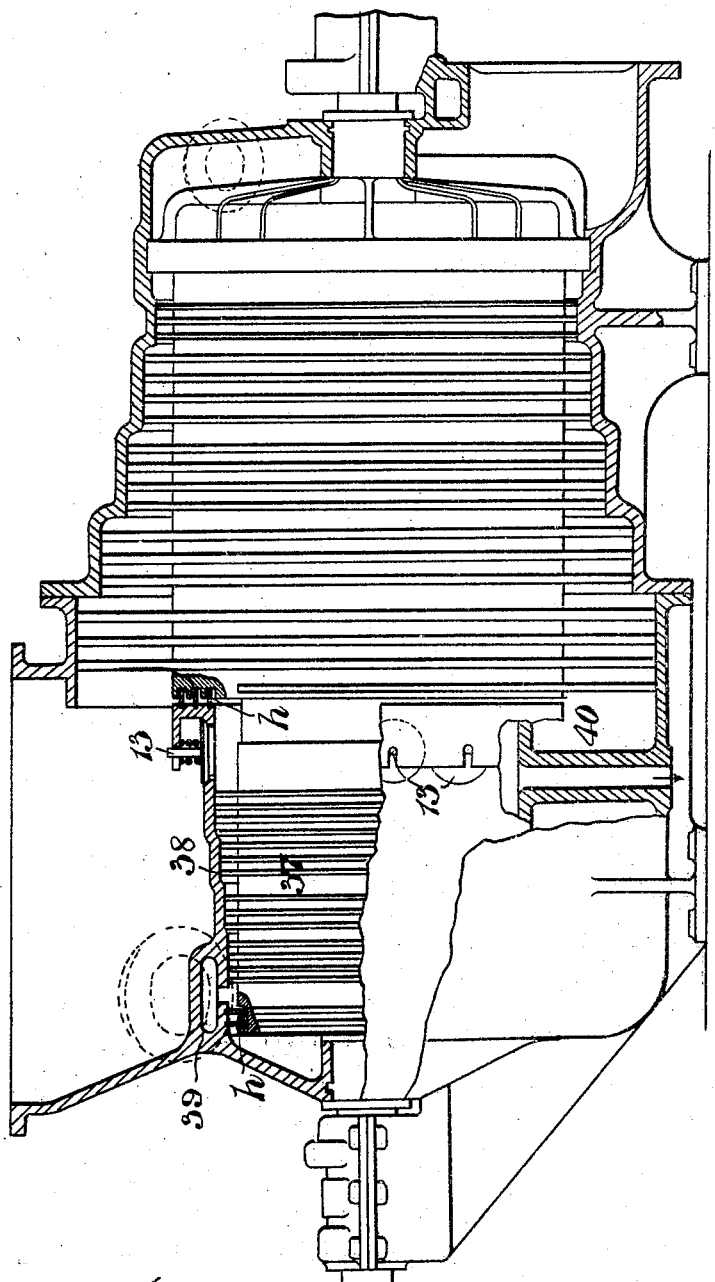

No. 775,634. Patented November 22, 1904.

UNITED STATES PATENT OFFICE.

CHARLES ALGERNON PARSONS, OF NEWCASTLE-UPON-TYNE, ENGLAND.

TURBINE.

SPECIFICATION forming part of Letters Patent No. 775,634, dated November 22, 1904.

Application filed February 27, 1904. Serial No. 195,672. (No model.)

*To all whom it may concern:*

Be it known that I, CHARLES ALGERNON PARSONS, a subject of the King of Great Britain and Ireland, residing at Heaton Works, Newcastle-upon-Tyne, in the county of Northumberland, England, have invented certain new and useful Improvements Relating to Turbines, (for which I have made application for Letters Patent in Great Britain, No. 4,747, bearing date February 28, 1903,) of which the following is a specification.

My invention relates to elastic-fluid turbines, and especially to means for the reduction of the skin friction of the rotating parts with the fluid in which they are immersed.

I have found that where turbine-blades are employed at the periphery of a disk of considerable diameter the skin friction of the disk supporting the blades and rotating in the exhaust of the medium operating the turbine or in air is a large source of loss in the utilization of the energy of the operating fluid.

My invention has for its object to reduce the loss above referred to and to provide special means for effecting reduction of skin friction in conjunction with reversing-turbines.

My invention consists in inclosing the idle or inoperative parts of one or more turbine-wheels, (including in some cases the driving or operative parts when inactive,) so that they are screened from the atmosphere and operating fluid and are rotated in a relatively highly attenuated fluid, whereby the resistance to rotation of the turbine is reduced.

My invention further consists in arranging the reversing-blades to normally rotate idly within the above-mentioned highly-attenuated fluid and providing non-return valves adapted to open when the turbine is reversed and discharge the exhaust-steam from the reversing-blades.

My invention is applicable to any turbine having one or more large disks or to turbine-cylinders short in proportion to their diameters, such as the turbines of de Laval, Curtis, Stumpf, Rateau, &c.

Figure 2:
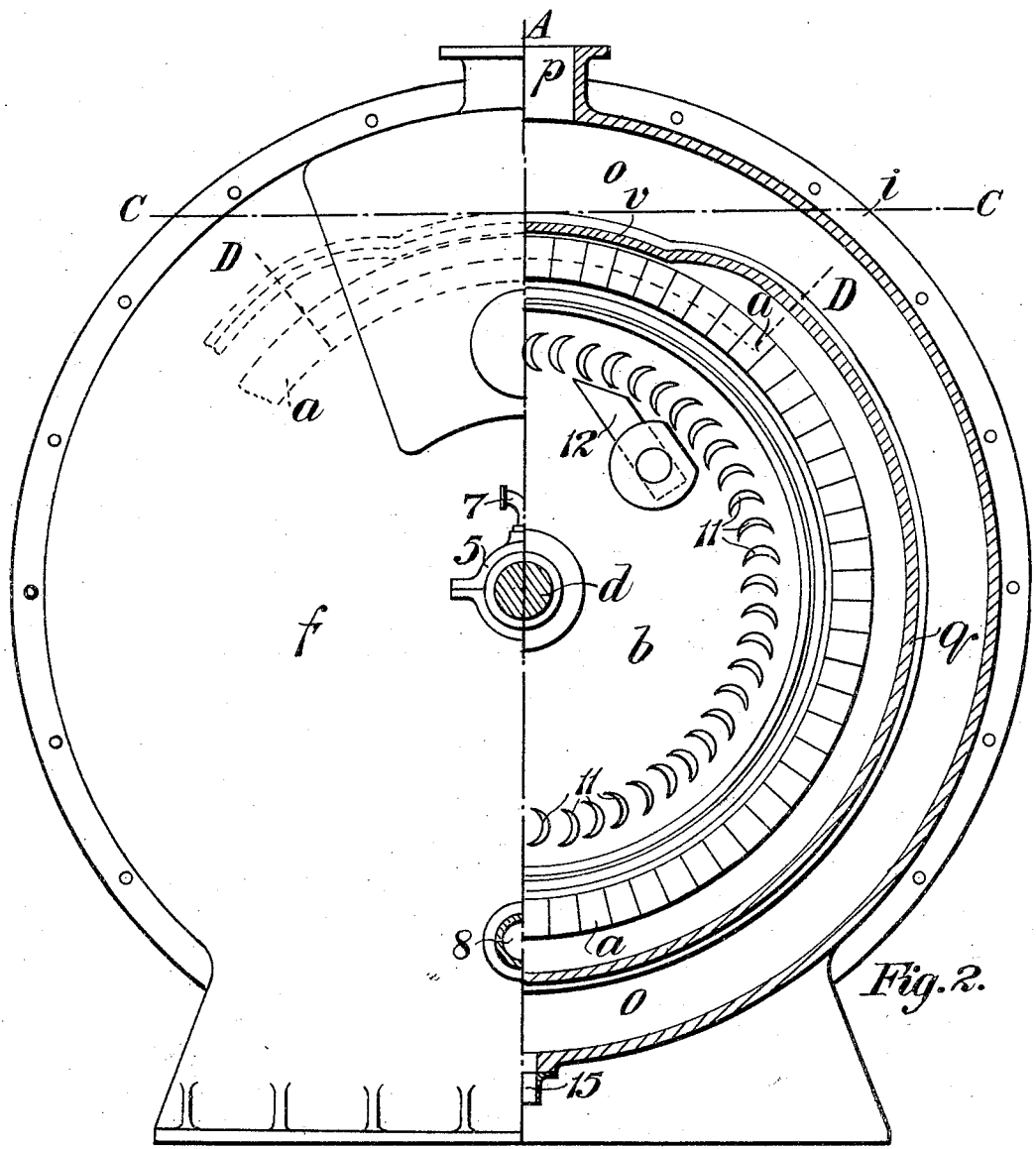

Referring now to the accompanying drawings, Figure 1 is a sectional elevation of a turbine with my invention applied in one manner, the section being on the line A A of Fig. 2. Fig. 2 is a half-outside and half-sectional elevation of the same, the section being on the line B B of Fig. 1. Fig. 3 is a sectional plan of the same on the line C C of Figs. 1 and 2. Fig. 4 is a part sectional plan on the line D D of Fig. 2. Fig. 5 is a part sectional elevation on the line E E of Fig. 6 with the steam-nozzle removed. Fig. 6 is a part elevation of Fig. 5 looking on the right inner face $e$ of the cover $i$, showing the adjustable sector-packing. Fig. 7 is a similar view of the left inner face of the casing $f$, showing the sector-packing. Fig. 8 is an enlarged sectional elevation of a portion of the turbine on the vertical center line, showing the packing-sectors. Fig. $8^a$ is a sectional view showing a modified form of packing. Fig. 9 is a modified form of the invention in which complete packing-rings are employed instead of sectors. Fig. 10 is a sectional end elevation on the vertical center line of another form of my invention. Fig. 11 is a sectional side elevation of the same on the line F F of Fig. 10. Fig. $11^a$ is an end elevation of the shaft packing-gland. Fig. 12 is a sectional view on the vertical section-line of a combined forward and reversing turbine, showing my invention applied to the reversing-turbine.

In carrying out the invention in one manner as applied to a single-disk jet-turbine and as shown in Figs. 1 to 8 I secure blades $a$ on the periphery of a disk $b$, mounted on a shaft $c$, journaled in any suitable manner at $d\ d$ and provided, preferably, with thrust-blocks (not shown) to resist end thrusts when the turbine is in operation. The diameter of the disk is preferably made large in order that a low angular velocity and a high circumferential velocity may be obtained.

The turbine-disk is inclosed in a casing from the wall $f$ and cover $i$, of which division-walls $q$ and $r$ project toward each other, making a faced joint at $e$. The flanges $q$ and $r$ divide the interior of the casing into two chambers $o$ and $x$, the former of which constitutes an exhaust-chamber and the latter a vacuum-chamber, in which the medium is more attenuated than that in the exhaust-chamber $o$.

The turbine disk and blades rotate with ample clearance in the chamber $x$, the walls of the chamber being a considerable distance clear from the disk and blades, except over a small section or segment of the disk and blades where the steam-nozzle and exhaust-port are arranged. At this part of the turbine the flanges $q$ and $r$ are brought down toward the turbine, so that the flange $q$ is very close to the ends of the blades. The flange $q$ is also set in at $g$ close to the sides of the blades and near to the circumferential rim of the disk, while the flange $r$ is formed with a wall 2 lying close to the sides of the blades, only the smallest practicable clearance consistent with good running at high speeds being allowed at $u$, $v$, and $w$, as shown in Figs. 1, 4, 5, 6, and 7.

The operating fluid impinges against the blades from the nozzle $m$ in the chest $l$, the nozzle being secured to a cover-plate $g'$, with its discharge-opening projecting through an opening $s$ in the wall 2 close to the blades. After impinging upon the blades the operating fluid passes through the exhaust-port $n$ into a passage 14 and exhaust-chamber $o$, whence it flows by the outlet $p$ to a condenser or to the atmosphere.

Leakage of steam in a circumferential direction between the walls and the tops and sides of the turbine-blades into the vacuum-chamber is limited by the smallness of the clearance at $u$, $v$, and $w$; but to prevent leakage of steam radially into the chamber $x$ at the steam-jet I provide this part of the turbine with segment-baffle packings, consisting of several baffle-segments $h$, (see Figs. 5 to 8,) entering undercut circular grooves in both sides of the rim of the disk and secured on one side of the turbine in grooves in the part $g$ of the casing-wheel $f$ and at the other side in grooves in an adjustable segmental block $k$, which rests upon and is guided by the flanges $j$. The block may be moved a little toward the rim of the disk, if required, by set-screws or the like passing through the cover.

If desired, the adjustable block $k$ may be dispensed with, and in this case the wall 2 may be brought lower down to join the flanges $j$ and be provided with curved grooves in which the segmental baffles $h$ are inserted.

Instead of running baffle-segments in grooves around the rim of the disk, as above described, the baffles may consist of edged segments touching or nearly touching the rim, as shown in Fig. 8$^a$.

Leakage of air into the vacuum-chamber $x$ along the shaft may be prevented by ring baffles 4, formed in halves and bearing in undercut grooves in the shaft, similar to those in the rim of the disk, and retained in position by grooves in divided glands 5 5, fixed to the casing and cover in any convenient manner. Each of the glands is preferably provided with an annular chamber or lantern 6, to which steam is admitted by a small pipe 7, whereby any leakage that may take place through the glands to the chamber $x$ will be of steam and not of air.

As the difference in pressure between the fluid in the exhaust-chamber and that in the vacuum-chamber is not great under ordinary circumstances, it is generally sufficient to provide a simple-faced joint at $e$, where the flanges $q$ and $r$ bear against each other.

The chamber $x$ is provided at its lowest part with a suction-pipe 8, connected to some suitable means for maintaining a higher vacuum in the chamber $x$ than prevails in exhaust-chamber $o$, which is supplied with a drain 15 for removing condensed water.

It will be seen that nearly all the surfaces of the disk lying radially within the blades—i. e., practically all the inoperative part of the disk, as well as the inoperative blades—are rotated in the attenuated medium of the vacuum-chamber, and are therefore screened from the driving and exhaust mediums and from the atmosphere, only the blades and parts of the disk opposite and close to the nozzle being outside the vacuum-chamber $x$. The resistance to rotation is by this means greatly reduced, and the efficiency of the turbine at light loads is much increased. If it be desired to render the turbine reversible, the disk may be provided with reversing-blades 11, which rotate idly in the vacuum-chamber $x$ while the turbine is being driven in a forward direction. The casing $f$ carries a nozzle 12, adapted to direct a jet of steam against the blades, and one or more non-return valves 13, arranged in the wall, are adapted to open when the pressure within the chamber $x$ exceeds that in the exhaust-chamber $o$, and thereby to discharge the exhaust-steam from the reversing-nozzle into the passage 14 and chamber $o$.

Instead of providing the turbine with a segment-packing, as above described, complete rings $h$ may be provided, as shown in Fig. 9. In this case the flange $j$ on one side of the turbine is made circular and carries a concentric ring $k'$, in which complete packing-rings $h$ bear, and on the other side the flange $g$ is made circular and also carries complete packing-rings $h$. The additional chamber $y$ thus formed communicates with the chambers $x$ through openings in the flanges $g$ and $j$. Small holes 31 through the disk put the two chambers $x$ in communication with each other. I prefer, however, to employ sections of packing-baffles instead of complete rings.

In some cases the turbine may be constructed with one or more rings of reversing-blades wholly or partially without the vacuum-chamber and operated by jets arranged in any convenient manner. If desired, more than one jet may be employed.

In carrying out my invention according to the form shown in Figs. 10 and 11 I arrange the reversing-blades 11 on a ring 16 radially beyond the ends of the blades $a$. The casing is constructed of two similar portions 17 and 18, bolted together and forming a chamber $x$, in which the inoperative main and reversing blades and portions of the disk rotate. As in the form shown in Figs. 1 to 8, the walls of the casing are brought close in against the blades, disk-rim, and reversing-blade-carrying ring over a small section or segment of the turbine-wheel, so that the operative parts of the turbine shall always run between the close parts of the walls with the smallest practicable clearance in order to reduce the leakage of steam into the vacuum-chamber $x$. Ample clearance is allowed in the chamber $x$ between the inoperative parts of the turbine and the walls of the chamber. The main and reversing steam-nozzles 24 and 23 are placed opposite openings 26 and 25, through which the steam after impinging upon the blades passes into annular exhaust-chambers 27 and 28, formed by the end covers 41 41 with the outside of the casings 17 and 18.

Baffle-segments $h$ are provided at the sector or segment portion of the casing to prevent leakage of steam into the vacuum-chamber, and the shaft is supplied with any suitable means for preventing the passage of air into the vacuum-chamber. I preferably employ at the shaft the baffle-ring device, hereinbefore described with reference to Figs. 10, 11, and 11$^a$, and the packing may be made adjustable longitudinally, if desired.

The annular exhaust-chambers are provided with suitable drains 35 for the removal of condensed water, and the vacuum-chamber is furnished with a pipe 34, connected with any suitable means for maintaining the vacuum.

It will be readily seen that the segmental baffles may be replaced by complete rings in a similar manner to that described with reference to Fig. 9. The segmental baffles are, however, preferable to complete rings.

In some cases I may provide the exhaust-opening opposite the reversing-nozzle with a non-return valve.

The invention may be applied to my well-known type of parallel-flow turbine, shown in Fig. 12. The main turbine-drum 36 is mounted upon the same shaft as a reversing-turbine drum 37, the exhaust ends of both turbines being arranged opposite each other. The end of the turbine-casing 38 is provided with a flange and baffle-rings $h$, bearing in grooves in the end of the main turbine-drum. Also the steam end of the reversing turbine is provided with packing-rings $h$. When the main turbine is in operation, a high vacuum is maintained in the space between the reversing-wheel and its casing by an exhauster connected with the passage 40. The reversing turbine thus runs idly in a more attenuated medium than the exhaust medium of the main turbine. Consequently the resistance to its rotation is reduced to a minimum.

When it is desired to reverse the direction of rotation, the connection with the exhauster is closed and steam is admitted at the inlet 39, the exhaust taking place through non-return valves 13.

The high vacuum may be obtained in the chambers which inclose the inoperative or idle parts of the turbine by means of a vacuum-pump, with or without a condenser, and preferably assisted by one of the vacuum-intensifier devices, described in my British Patent No. 840 of 1902.

I have found that even when working with a vacuum of thirty inches of mercury it is important to avoid as far as possible all radial ribs or similar obstructions within the vacuum-casing. If projections are necessary, they should be of annular form and the interior of the casing made as smooth as possible.

In some cases jets may be placed inside the casing, pointing in such a direction as shall give a spin to the remaining gases in the same direction as the disk, and thus reduce the skin-friction to a still further extent.

I may apply my invention in conjunction with either ordinary non-condensing turbines or with condensing-turbines, and I may in the latter case either connect the vacuum chamber or chambers with the ordinary condenser or with a separate small condenser to maintain the high vacuum. In the case of non-condensing turbines quite a small condensing plant will provide the vacuum required for a turbine of considerable power.

In disk turbines with my invention applied I preferably provide longitudinal adjustments, whereby the leakage through the circumferential ring or baffle-joint may be maintained as small as possible.

It will be obvious that generally similar baffle-joints must be made on both sides of the disk. In some cases the baffles may be made tight radially instead of longitudinally, or both methods of adjustment may be combined in one set of baffles.

I may apply my invention to a turbine in which a large number of disks are employed, similar arrangements to those hereinbefore described being provided for the maintenance of a vacuum over the surfaces of the disks lying radially within the blades or over the whole surfaces of the disks and blades except where the jets impinge upon the latter.

In applying the invention to a turbine having one or more disks and jets directed against the blades of the first disk and means for conducting the steam to the blades of the succeeding disks it may be undesirable to run the disk or disks upon the blades of which the steam first impinges in the vacuum-chamber, as the difference in pressure between the steam at the inlet end of the turbine and the first vacuum-chamber may be too high for a running packing or baffle joint to prevent somewhat serious leakage. In such a case I may only apply my vacuum-screening to the low-pressure disks.

When it is desired to increase the power generated by a turbine of the type which employs steam-jets and one or more bladed disks, I prefer to obtain the increase by raising the height of the blades and the breadth of the jets instead of employing a larger number of jets operating on short blades, which would reduce the length of the screened circumference.

The essential feature of my invention is the separation of the idle or inoperative and driving or operative parts of the turbine and the running of the idle portion within a high vacuum.

Having now described my invention, what I claim as new, and desire to secure by Letters Patent, is—

1. A turbine in which the inoperative portions of the rotatable blade-carrying member are immersed in a medium which is attenuated in relation to the discharge of the medium which acts on the turbine-blades, substantially as described.

2. A turbine in which the inoperative portions of the rotatable blade-carrying member and the inoperative blades are immersed in a medium which is attenuated in relation to the discharge of the medium which acts on the turbine-blades, substantially as described.

3. A turbine in which a portion of the rotatable blade-carrying member and the inoperative main and reversing blades are immersed in a medium which is attenuated in relation to the discharge of the medium which acts on the turbine-blades, substantially as described.

4. A turbine in which the rotatable bladed reversing member when inoperative is immersed in a medium which is attenuated in relation to the discharge of the medium which acts on the turbine-blades, substantially as described.

5. A turbine having the inoperative portions of the blade-carrying member and the inoperative blades inclosed in a chamber in which there is a more attenuated medium than the atmosphere or the exhaust of the operating fluid, and running packings to prevent leakage of the operating fluid into the chamber, substantially as described.

6. A turbine having the inoperative parts of its bladed member inclosed in a chamber in which there is a medium which is attenuated in relation to the operating fluid and the atmosphere, reversing-blades on the bladed member, which reversing-blades normally rotate in the attenuated medium in the chamber, means for supplying fluid to the reversing-blades, and a non-return valve in the chamber adapted to open when the turbine is being reversed, substantially as described.

7. A turbine comprising, a bladed disk, a nozzle adapted to direct a jet of operating fluid against the blades, a chamber inclosing inoperative portions of the disk and the inoperative blades, the medium in the chamber when the turbine is operating in a forward direction being attenuated in relation to the exhaust of the working fluid and the atmosphere, reversing-blades on a part of the disk inclosed in the chamber, a reversing-nozzle adapted to impinge fluid against the reversing-blades, and a non-return valve in the chamber adapted to open only when the reversing-nozzle is in operation, substantially as described.

8. A turbine comprising a bladed disk, a nozzle adapted to direct a jet of operating fluid against the blades, a chamber inclosing the inoperative portions of the disk and the inoperative blades, a running baffle-packing between the disk and chamber-walls, the medium in the chamber being more attenuated than the exhaust of the working fluid, reversing-blades, a reversing-nozzle adapted to impinge fluid against the reversing-blades and a non-return valve in the chamber adapted to open only when the reversing-nozzle is in operation, substantially as described.

9. A turbine having the inoperative portions of the blade-carrying member and the inoperative blades inclosed with ample clearance in a chamber in which there is a more attenuated medium than the exhaust of the working fluid, the walls of the chamber being brought so close to the operative portion of the turbine and blades as to leave the minimum practicable clearance, segmental baffles in the walls of the chamber adjacent to the operative parts of the disk and working in circumferential grooves in the disk, whereby leakage of the working fluid radially into the chamber is prevented, substantially as described.

10. A turbine having the inoperative portions of the blade-carrying member and the inoperative blades inclosed with ample clearance in a chamber in which there is a more attenuated medium than the exhaust of the working fluid, the walls of the chamber being brought so close to the operative portion of the turbine and blades as to leave the minimum practicable clearance, baffles in the walls of the chamber adjacent to the operative parts of the disk and working in circumferential grooves in the disk, whereby leakage of the working fluid radially into the chamber is prevented, substantially as described.

11. A turbine comprising, a bladed disk, a nozzle adapted to direct a jet of working fluid against certain of the blades at a time, a chamber inclosing with ample clearance the inoperative parts of the disk and the inoperative blades, the walls of the chamber being brought so close to the operative portion of the disk and blades as to leave the minimum practicable clearance, segmental baffles carried by the close part of the walls and working in concentric circular grooves in the disk, whereby leakage of the working fluid radially into the chamber is prevented, reversing-blades on part of the disk inclosed in the chamber, a reversing-nozzle and a non-return valve adapted to open only when the turbine is reversed, substantially as described.

12. A turbine comprising, a bladed disk, a nozzle adapted to direct a jet of working fluid against certain of the blades at a time, a chamber inclosing with ample clearance the inoperative parts of the disk and the inoperative blades, the walls of the chamber being brought so close to the operative portion of the disk and blades as to leave the minimum practicable clearance, baffles carried by the close part of the walls and working in concentric grooves in the disk, whereby leakage of the working fluid radially into the chamber is prevented, reversing-blades on part of the disk inclosed in the chamber, a reversing-nozzle, and a non-return valve adapted to open only when the turbine is reversed, substantially as described.

13. A turbine comprising, a disk, forward blades on the periphery of the disk, a nozzle adapted to direct a jet of working fluid against these blades, a reversing-nozzle and reversing-blades radially beyond the forward blades, a chamber inclosing with ample clearance the inoperative forward and reversing blades and the inoperative parts of the disk, the walls of the disk being brought so close to the operative portions of the disk and blades as to leave the smallest practicable clearance at the nozzle, baffles carried by the close part of the walls and working in concentric circular grooves in the disk whereby leakage of fluid radially into the chambers is prevented, substantially as described.

14. A turbine comprising forward blades, reversing-blades, a chamber in which the reversing-blades move, and means for maintaining the medium in the said chamber at a greater degree of attenuation than the exhaust of the driving medium, substantially as described.

15. A turbine comprising forward blades, reversing-blades, a chamber in which the reversing-blades move, a non-return valve controlling a port leading from the said chamber and adapted to open when the reversing-blades are operative, and means for maintaining the medium in the chamber in which the reversing-blades are immersed at a greater degree of attenuation than the exhaust of the driving medium.

In witness whereof I have hereunto set my hand in presence of two witnesses.

CHARLES ALGERNON PARSONS.

Witnesses:
HENRY GRAHAM DAKYUS, Jr.,
WILLIAM MENZIES JOHNSTON.